US008710380B2

(12) United States Patent
Francke

(10) Patent No.: US 8,710,380 B2
(45) Date of Patent: Apr. 29, 2014

(54) APPARATUS AND METHOD FOR WEIGHING AN ITEM OF MAIL DURING TRANSPORT THROUGH A SORTING INSTALLATION AND HAVING AN ANTI-VIBRATION DEVICE

(75) Inventor: Jürgen Francke, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 514 days.

(21) Appl. No.: 13/056,670

(22) PCT Filed: Jul. 29, 2009

(86) PCT No.: PCT/EP2009/059819
§ 371 (c)(1),
(2), (4) Date: Apr. 25, 2011

(87) PCT Pub. No.: WO2010/012779
PCT Pub. Date: Feb. 4, 2010

(65) Prior Publication Data
US 2011/0192656 A1 Aug. 11, 2011

(30) Foreign Application Priority Data

Jul. 29, 2008 (DE) .......................... 10 2008 035 300

(51) Int. Cl.
G01G 19/00 (2006.01)
B07C 5/18 (2006.01)
B65G 15/30 (2006.01)

(52) U.S. Cl.
USPC ............ 177/25.15; 177/145; 705/407; 271/2; 271/272; 271/274; 198/626.4; 198/626.6

(58) Field of Classification Search
USPC ........ 198/626.1–626.6, 817; 271/2, 272–275; 177/25.15, 145, 184–189; 705/407
See application file for complete search history.

(56) References Cited

U.S. PATENT DOCUMENTS 2,601,929 A * 7/1952 Brichard ...................... 414/754
3,901,797 A 8/1975 Storace et al.
4,190,185 A * 2/1980 Thate ............................ 226/172

(Continued)

FOREIGN PATENT DOCUMENTS

DE 196 04 090 A1 8/1997
DE 20 2007 016 722 U1 2/2008

(Continued)

Primary Examiner — Randy W Gibson
(74) Attorney, Agent, or Firm — Laurence A. Greenberg; Werner H. Stemer; Ralph E. Locher

(57) ABSTRACT

An apparatus and a method weigh an object, in particular a flat item of mail, during transport. A conveying device having an endless conveying belt and a counterpart conveying element is able to temporarily grip an object in a clamping region and to transport it in a transporting direction. Weighing scales are able to weigh the object while the object is gripped in a clamping region. The damping element is configured to damp vibrations of an object gripped in the clamping region. The damping element has a surface which is curved in the transporting direction. The endless conveying belt is guided in such a way around the curved surface that the endless conveying belt rests areally against the curved surface in a damping region and the endless conveying belt and the counterpart conveying element are configured to guide the object gripped in the clamping region past the curved surface.

11 Claims, 3 Drawing Sheets

(56) References Cited

U.S. PATENT DOCUMENTS

| | | | |
|---|---|---|---|
| 4,938,468 A * | 7/1990 | Wafler | 271/272 |
| 5,086,855 A | 2/1992 | Tolson | |
| 5,303,913 A * | 4/1994 | Trouquilla | 271/274 |
| 5,499,810 A * | 3/1996 | Tranquilla | 271/274 |
| 5,524,878 A * | 6/1996 | Trouquilla | 271/274 |
| 6,107,579 A | 8/2000 | Kinnemann | |
| 6,595,348 B1 * | 7/2003 | Grasswill et al. | 198/604 |
| 6,938,894 B2 * | 9/2005 | Miller et al. | 271/274 |
| 7,210,570 B2 | 5/2007 | Marisy et | |
| 7,437,332 B2 | 10/2008 | Jacobson et al. | |
| 7,500,554 B2 * | 3/2009 | Schererz et al. | 198/817 |
| 7,703,769 B2 * | 4/2010 | Schwarzbauer | 271/275 |
| 7,900,915 B2 * | 3/2011 | Berg et al. | 271/264 |
| 8,106,315 B2 * | 1/2012 | Turner | 177/25.15 |
| 8,148,650 B2 * | 4/2012 | Sye | 177/25.15 |
| 2005/0278264 A1 | 12/2005 | Jacobson et al. | |
| 2006/0070851 A1 | 4/2006 | Marisy et al. | |
| 2009/0134568 A1 | 5/2009 | Berg et al. | |
| 2010/0282521 A1 * | 11/2010 | Turner | 177/1 |

FOREIGN PATENT DOCUMENTS

| | | |
|---|---|---|
| EP | 1 603 083 A1 | 12/2005 |
| EP | 2 040 049 A1 | 3/2009 |
| FR | 2 692 565 B1 | 12/1993 |
| FR | 2 849 188 A1 | 6/2004 |

* cited by examiner

APPARATUS AND METHOD FOR WEIGHING AN ITEM OF MAIL DURING TRANSPORT THROUGH A SORTING INSTALLATION AND HAVING AN ANTI-VIBRATION DEVICE

BACKGROUND OF THE INVENTION

Field of the Invention

The invention relates to an apparatus and a method for weighing an object, in particular a flat item of mail, during transport.

It is desired to weigh an item of mail while this item of mail is being transported through a sorting installation. Weighing should slow down the transport and processing of the item of mail as little as possible. However, an item of mail being transported vibrates and this can lead to a false measurement result.

An apparatus having the features of the preamble of claim 1 and a method having the features of the preamble of claim 10 are known from FR 2849188 A1 and US 2006/0070851 A1.

FR 2849188 A1 and US 2006/0070851 A1 describe an apparatus and a method for dynamically weighing items of mail. This apparatus has a conveying device which comprises a first pair of finned wheels ("finned wheels, roues à ailettes") 2A, 3A and a further pair of finned wheels 2B, 3B and also conveying belts 2C, 3C. Furthermore, the apparatus has weighing scales which the apparatus uses for weighing using the electromagnetic principle of flux compensation.

While they are being weighed, the items of mail slide through a trough ("trough, goulotte") 4 are gripped in the process by the conveying belts 2C, 3C. A further finned wheel ("finned wheels, roues a ailettes") 5 has an elastic circumference, is arranged between the two pairs of finned wheels 2A, 3A and 2B, 3B and presses the conveying belts 2C, 3C and thus the items of mail against a side wall of the trough 4. The finned wheels 2A, 3A, 2B, 3B and 5 cause damping on account of their elasticity.

U.S. Pat. No. 5,086,855 describes an apparatus for transporting objects having irregular and varying dimensions. FIG. 4 of U.S. Pat. No. 5,086,855 shows a configuration in which a plurality of springs press a conveying belt elastically against an object to be transported.

DE 19604090 A1 describes an apparatus and a method for weighing items of mail. The items of mail are permanently gripped by endless conveying belts while they are weighed.

In DE 202007016722 U1, an object to be weighed is temporarily gripped between two horizontal endless conveying belts in a clamping region and guided away via weighing scales by the rotating conveying belts. In order to damp vibrations of the object to be weighed, which could falsify the measurement result, a damping element (in that case designated as a guide element) is provided. This damping element exerts a lateral force on the object being transported. In one embodiment, the damping element comprises two brushes, which are pressed from two sides against the object gripped in the clamping region. Other types of guide elements, between which the object is guided, are also possible.

The laid open specification EP 2040049 A1, which was published after the priority date, describes letter weighing scales having a stabilizing section. This stabilizing zone is provided before or after the weighing scales so that an item of mail passes through this stabilizing zone before or after it is weighed. The item of mail is guided in this stabilizing zone without any lateral clamping.

BRIEF SUMMARY OF THE INVENTION

The object of the invention is to provide an apparatus and a method not requiring that the object to be weighed be transported through between two components of the damping element.

According to the solution, an apparatus for weighing an object, in particular a flat item of mail, is provided. This apparatus comprises the following components:
a conveying device,
weighing scales and
a damping element.

The conveying device has an endless conveying belt and a counterpart conveying element. The counterpart conveying element is, for example, likewise a conveying belt or a sliding plane. The endless conveying belt and the counterpart conveying element are arranged in such a way that a clamping region for temporarily gripping an object to be weighed is formed between the conveying belt and the counterpart conveying element. The conveying device is configured to transport an object gripped in the clamping region in a transporting direction.

The weighing scales are configured to weigh an object while the object is gripped in the clamping region.

The damping element is configured to damp vibrations of an object gripped in the clamping region. The damping element has a curved surface in the transporting direction.

The endless conveying belt is guided in such a way around the curved surface that
the endless conveying belt rests areally against the curved surface in a damping region and
the endless conveying belt and the counterpart conveying element are configured to guide an object gripped in the clamping region past the curved surface.

The damping element damps vibrations of an object gripped in the clamping region.

The object to be weighed temporarily rests areally against the endless conveying belt before or while it is weighed. This configuration according to the invention effects particularly good damping of the object, better than two opposing damping components, because the damping element quickly absorbs the vibrations of the object.

The damping element of the apparatus according to the invention can be realized and produced in a mechanically simple manner. This damping element requires considerably less cleaning and maintenance than, for example, a set of brushes between which the object to be weighed is transported through.

Preferably, the counterpart conveying element is designed as an elastic endless conveying belt. This configuration allows objects of different thicknesses to be weighed, wherein the thickness of the object is its extent perpendicularly to the transporting direction. The elastic endless conveying belt adapts itself to different thicknesses. It is not necessary to displace the damping element perpendicularly to the transporting direction in order to adapt the apparatus to different object thicknesses.

The damping element is preferably connected to a stationary holder via a mechanical coupling. This mechanical coupling absorbs vibration energy.

The invention is explained in the following with reference to an exemplary embodiment. In the drawing:

DESCRIPTION OF THE INVENTION

In the exemplary embodiment, the apparatus according to the solution is used in a sorting installation for items of mail. Flat items of mail, in particular standard and large letters, magazines and postcards, are intended to be weighed. The determined weight of each item of mail is used, for example, to calculate the delivery fee or to check the delivery fee that has already been paid.

Figure 1:
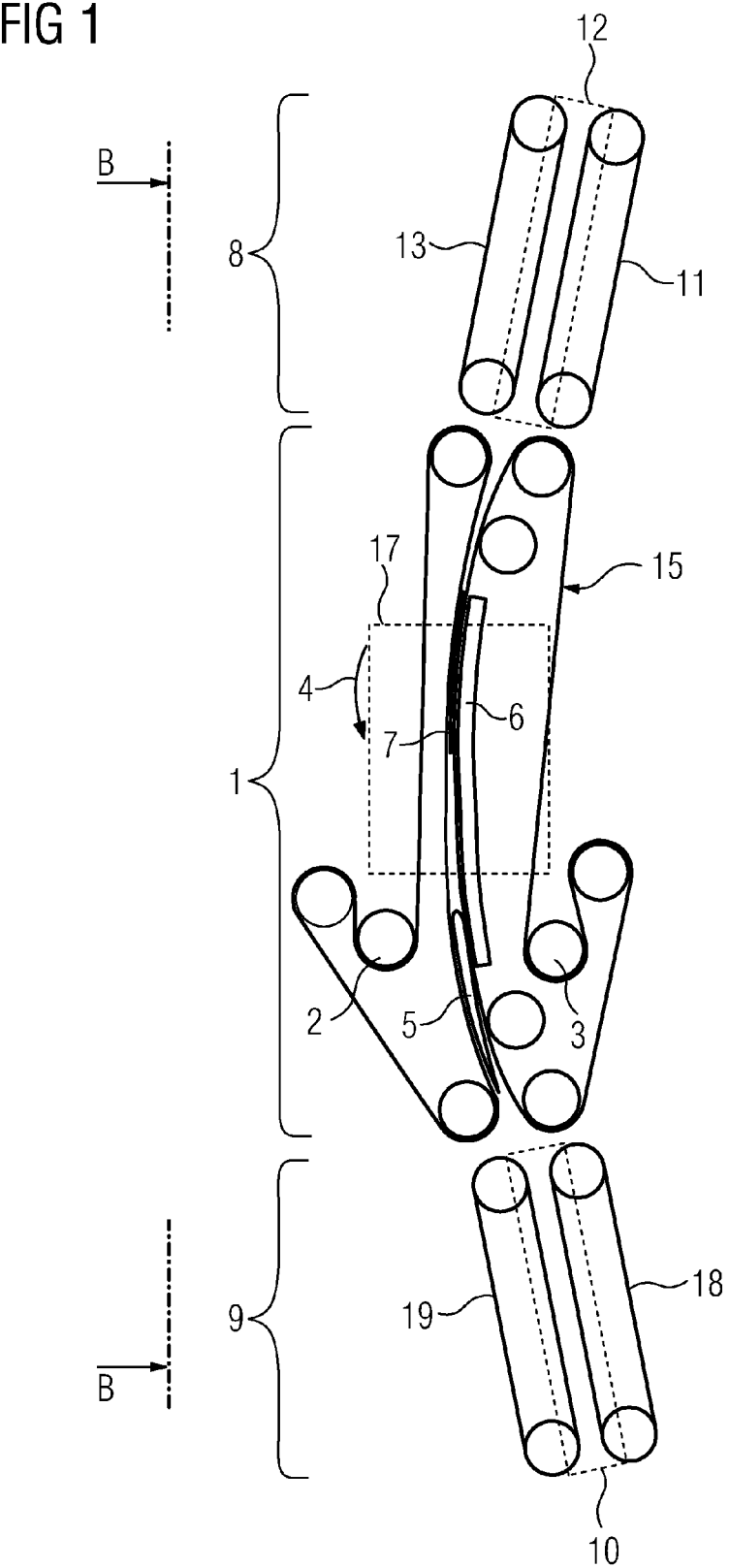
FIG. 1 shows a plan view of the weighing apparatus having a feeding conveying device and a removing conveying device.

FIG. 1 shows a plan view of the weighing apparatus having a feeding conveying device 8 and a removing conveying device 9.

The feeding conveying device 8 comprises two lateral endless conveying belts 11, 13, which are guided around rollers. The rotational axes of these rollers are perpendicular to the plane of the drawing in FIG. 1. The items of mail to be transported stand on one edge and in an approximately perpendicular manner on an underfloor conveying belt 12 and are transported to the weighing device 1 by the underfloor conveying belt 12. The feeding conveying device forms a U-shaped transporting channel. The items of mail are not clamped between the two conveying belts 11, 13 but simply rest against one of these conveying belts. As a result of this, gravitational force orients the items of mail on their bottom edges and the items of mail are transported with little slip.

The removing conveying device 9, too, is configured as a U-shaped transporting channel. It comprises two lateral endless conveying belts 18, 19 and an underfloor conveying belt 10.

The weighing device 1 is arranged between the feeding conveying device 8 and the removing conveying device 9. In the exemplary embodiment, the weighing device comprises two elastic endless conveying belts 15, 16. These are arranged in such a way that a clamping region for temporarily gripping an item of mail is formed between them. Rather than being configured as an endless conveying belt 16, the counterpart conveying element can also be configured in another way, for example as a roller or as a sliding plane, i.e. as an immobile component having a smooth surface.

While they pass through the weighing device 1, the items of mail are temporarily clamped between two elastic endless conveying belts 15, 16. As soon as an item of mail has reached the end of the feeding conveying device 8, it is gripped by the two endless conveying belts 15, 16 and is temporarily located between these conveying belts. These conveying belts rotate at the same speed and have a rough surface. The items of mail are transported with little slip.

Each of the two endless conveying belts 15, 16 is guided around a plurality of rollers. The roller 2 is a driven roller, which drives and moves the conveying belt 16. The conveying belt 15 is moved by the driven roller 3. The remaining rollers around which the endless conveying belts 15, 16 are guided are drive-free running rollers. The endless conveying belts 15, 16 are elastic and guided tightly around the rollers.

In FIG. 1, a thick item of mail 5 and a thin item of mail 7 are shown by way of example. The thin item of mail 7 is currently located over weighing scales 17 of the weighing device 1. The thick item of mail 5 has already been weighed and is located on the path to the removing conveying device 9. Both items of mail 5, 7 are gripped by the two conveying belts 15, 16.

The weighing scales 17 are configured to weigh moving items of mail. The two conveying belts 15, 16 are thus not stopped as soon as an item of mail is located over the weighing scales 17, but continue to move. In one configuration, the item of mail to be weighed is not even slowed down.

According to the solution, the weighing device 1 further comprises a damping element 6, which has a curved surface. The endless conveying belt 15 rests areally against this curved surface of the damping element 6. The damping element 6 preferably has a smooth surface so that there is little friction between the conveying belt 15 or an item of mail resting thereon and the curved surface.

The conveying belt 16, too, rests areally against this curved surface as long as the two conveying belts 15, 16 are not gripping an item of mail.

The damping element 6 is preferably in the form of a solid body. The latter is connected via a mechanical coupling to that support on which the rollers, around which the endless conveying belts 11, 13, 15, 16, 18, 19 are guided, are mounted. In one configuration, the mechanical coupling is configured to absorb vibration energy which an item of mail exerts on the damping element.

Figure 2:
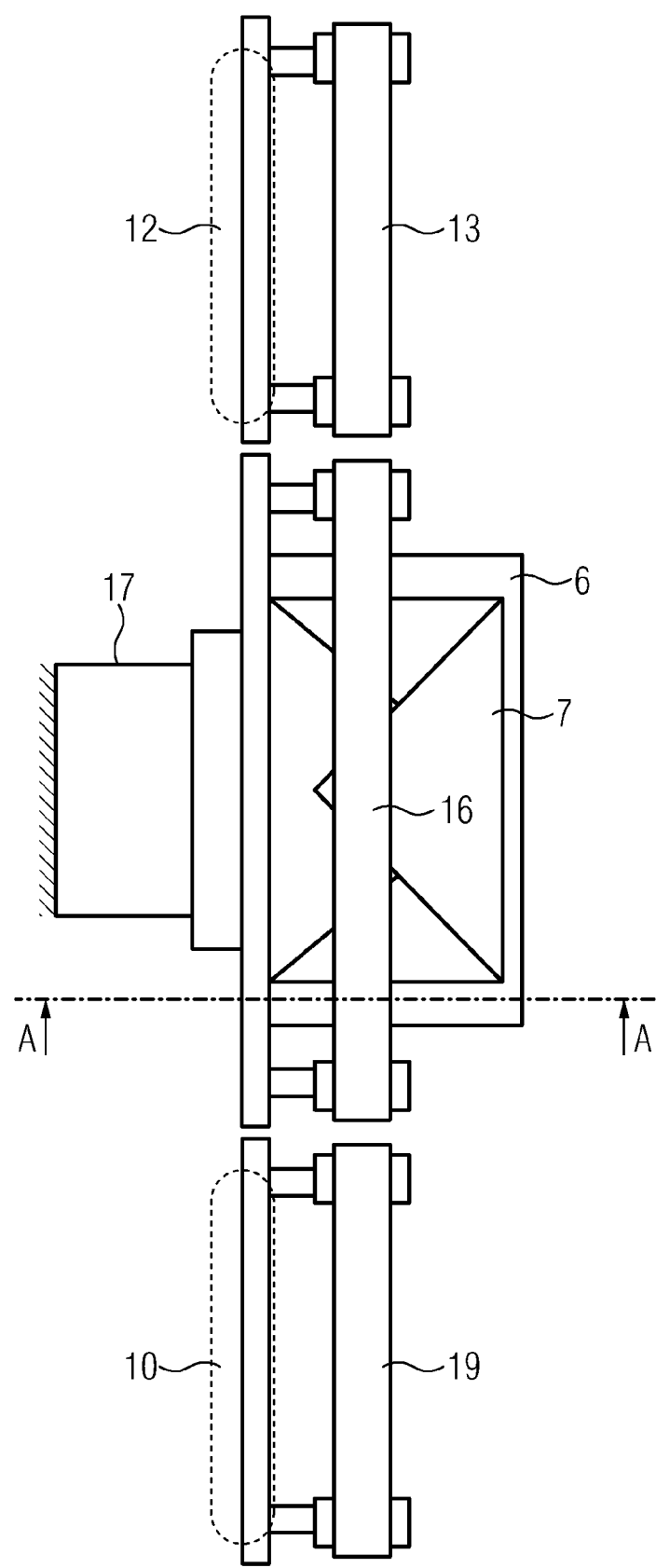
FIG. 2 shows a side view of the weighing apparatus in FIG. 1.

FIG. 2 shows a side view of the weighing apparatus in FIG. 1 in the plane B-B. For the sake of clarity, the conveying belt 15 has been omitted. Three endless conveying belts 13, 16, 19 and a plurality of rollers, around which these conveying belts are guided, are illustrated. The curvature of the damping element 6 is not illustrated in the side view. Furthermore, the underfloor conveying belts 10, 12 are indicated.

It can be seen that the thin item of mail 7 to be weighed is taller than the endless conveying belt 16 is wide. The effect of this is that an item of mail to be weighed rests against the two endless conveying belts 15, 16 in one strip and directly against the curved surface in two further strips. The effect of the two endless conveying belts 15, 16 is that the item of mail is curved. As a result, the item of mail rests areally against the curved surface of the damping element 6. The effect of this configuration is that vibrations of the thin item of mail 7 are transmitted directly to the damping element 6 and are damped by the latter. As a result, the thin item of mail 7 scarcely vibrates any longer when it reaches the weighing scales 17.

Figure 3:
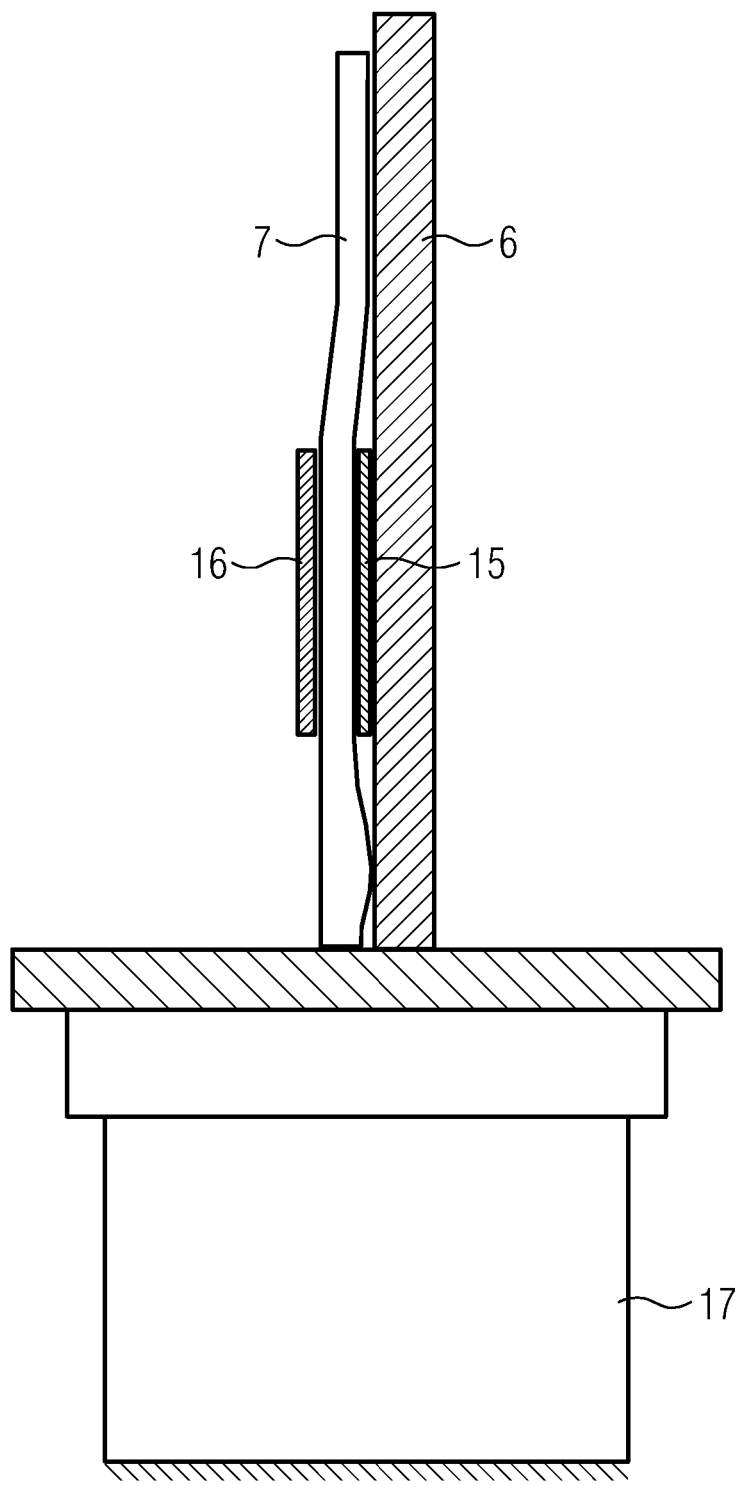
FIG. 3 shows a view in the plane A-A in FIG. 2.

FIG. 3 shows the weighing apparatus from the front, namely a view in the plane A-A in FIG. 2. From the front, the curved damping element 6 appears as a rectangle. Because the movement of the curved item of mail 7 is guided past the curved surface, air resistance causes the item of mail to be pressed and to rest areally against the curved surface in an upper and a lower strip. In this case, the item of mail is curved slightly about its longitudinal axis—as seen in the transporting direction. The effect of resting areally is that vibrations of the item of mail are transmitted particularly well to the damping element 6. In a central strip, the thin item of mail 7 is held by the two endless conveying belts 15, 16.

| List of reference signs | |
|---|---|
| Reference sign | Meaning |
| 1 | Weighing device |
| 2 | Driven roller of the counterpart conveying element 16 |
| 3 | Driven roller of the endless conveying belt 15 |
| 4 | Transporting direction |
| 5 | Item of mail |
| 6 | Damping element |
| 7 | Thin, flexible item of mail |
| 8 | Feeding conveying device upstream of the weighing scales 17 |
| 9 | Removing conveying device downstream of the weighing scales 17 |
| 10 | Underfloor conveying belt of the removing conveying device 9 |
| 12 | Underfloor conveying belt of the feeding conveying device 8 |

-continued

List of reference signs

| Reference sign | Meaning |
|---|---|
| 11, 13 | Endless conveying belts of the feeding conveying device 8 |
| 15 | Endless conveying belt of the conveying device |
| 16 | Counterpart conveying element of the conveying device in the form of a further endless conveying belt |
| 17 | Weighing scales |
| 18, 19 | Endless conveying belts of the removing conveying device 9 |

The invention claimed is:

1. An apparatus for weighing an object, the apparatus comprising:
a conveying device having an endless conveying belt and a counterpart conveying element disposed such that a clamping region for temporarily gripping the object to be weighed being formed between said endless conveying belt and said counterpart conveying element, said conveying device transporting the object gripped in said clamping region in a transporting direction;
weighing scales for weighing the object while the object is gripped in said clamping region;
a damping element for damping vibrations of the object gripped in said clamping region;
said endless conveying belt and said counterpart conveying element guiding the object gripped in said clamping region past said damping element;
said damping element having a curved surface in the transporting direction and said endless conveying belt being guided in such a way around said curved surface that said endless conveying belt rests areally against said curved surface in a damping region and said endless conveying belt and said counterpart conveying element configured to guide the object gripped in said clamping region past said curved surface; and
said endless conveying belt having an extent in a vertical direction resting against said curved surface and said extent of said endless conveying belt being less than an extent of said curved surface in the vertical direction, the apparatus configured such that a flexible object, being gripped in said clamping region and pressing against said curved surface, rests areally against said curved surface while the flexible object is guided past said curved surface.

2. An apparatus for weighing an object, the apparatus comprising:
a conveying device having an endless conveying belt and a counterpart conveying element disposed such that a clamping region for temporarily gripping the object to be weighed being formed between said endless conveying belt and said counterpart conveying element, said conveying device transporting the object gripped in said clamping region in a transporting direction;
weighing scales for weighing the object while the object is gripped in said clamping region;
a damping element for damping vibrations of the object gripped in said clamping region;
said endless conveying belt and said counterpart conveying element guiding the object gripped in said clamping region past said damping element;
said damping element having a curved surface in the transporting direction and said endless conveying belt being guided in such a way around said curved surface that said endless conveying belt rests areally against said curved surface in a damping region and said endless conveying belt and said counterpart conveying element configured to guide the object gripped in said clamping region past said curved surface;
said counterpart conveying element being an elastic endless conveying belt and the apparatus configured such that said counterpart conveying element and said endless conveying belt grip and transport the object in said clamping region, said elastic counterpart conveying element pressing said endless conveying belt and the object against said curved surface as a result of stretching of said elastic counterpart conveying element while the object is guided past said curved surface; and
said endless conveying belt having an extent in a vertical direction resting against said curved surface and said extent of said endless conveying belt being less than an extent of said curved surface in the vertical direction, the apparatus configured such that a flexible object, being gripped in said clamping region and pressed against said curved surface, rests areally against said curved surface while the flexible object is guided past said curved surface.

3. The apparatus according to claim 2, wherein said damping element has a solid body and said curved surface is a surface of said solid body.

4. The apparatus according to claim 2, further comprising:
a stationary holder; and
a mechanical coupling, said damping element connected to said stationary holder via said mechanical coupling and said mechanical coupling is configured to absorb vibration energy.

5. The apparatus according to claim 2, wherein the apparatus is configured such that said conveying device transports the object to be weighed while said weighing scales are weighing the object.

6. The apparatus according to claim 2, further comprising a feeding conveying device having an underfloor conveying belt, said feeding conveying device disposed upstream of said conveying device as seen in the transporting direction and configured to transport the object to be weighed to the conveying device.

7. A method for weighing an object, which comprises the steps of:
temporarily gripping the object between an endless conveying belt and a counterpart conveying element in a clamping region;
transporting a gripped object in a transporting direction such that the gripped object is brought into a measuring position;
weighing the object being in the measured position by means of weighing scales;
providing a damping element for damping vibrations of the gripped object, the damping element having a curved surface;
guiding the object gripped in the clamping region past the damping element during transport;
forming the endless conveying belt to have an extent in a vertical direction resting against the curved surface and the extent of the endless conveying belt being less than an extent of the curved surface in the vertical direction, a flexible object being gripped in the clamping region and pressing against the curved surface, rests areally against the curved surface while the flexible object is guided past the curved surface;

while the object is being transported, guiding the object gripped in the clamping region past the curved surface such that the endless conveying belt rests areally against the curved surface for a period of time and during the period of time the transporting direction in which the object is transported is changed, the curved surface absorbing vibrations of the object while the object is guided past the curved surface.

8. The method according to claim 7, wherein:
the counterpart conveying element and the endless conveying belt grip and transport the object in the clamping region;
the counterpart conveying element is stretched during transport; and
the elastic counterpart conveying element presses the endless conveying belt and the gripped and transported object against the curved surface as a result of stretching the elastic counterpart conveying element while the object is guided past the curved surface.

9. The method according to claim 8, which further comprises while the object is being guided past, pressing the object against the curved surface such that the object rests areally against the curved surface.

10. The method according to claim 7, which further comprises weighing via the weighing scales the object while the conveying device is transporting the object.

11. The method according to claim 7, which further comprises connecting the damping element to a stationary holder via a mechanical coupling and the mechanical coupling absorbs vibration energy.

* * * * *